United States Patent
Matsuyama et al.

(10) Patent No.: US 10,888,951 B2
(45) Date of Patent: Jan. 12, 2021

(54) METHOD FOR PRODUCING METAL MEMBER

(71) Applicant: KOMATSU LTD., Tokyo (JP)

(72) Inventors: Toshikazu Matsuyama, Hirakata (JP); Masaharu Amano, Hirakata (JP); Yoshitaka Shibata, Hirakata (JP)

(73) Assignee: KOMATSU LTD., Tokyo (JP)

( * ) Notice: Subject to any disclaimer, the term of this patent is extended or adjusted under 35 U.S.C. 154(b) by 238 days.

(21) Appl. No.: 15/560,171

(22) PCT Filed: Apr. 15, 2015

(86) PCT No.: PCT/JP2015/061591
§ 371 (c)(1),
(2) Date: Sep. 21, 2017

(87) PCT Pub. No.: WO2016/166841
PCT Pub. Date: Oct. 20, 2016

(65) Prior Publication Data
US 2018/0085848 A1 Mar. 29, 2018

(51) Int. Cl.
*B23K 20/12* (2006.01)
*B23K 20/24* (2006.01)
(Continued)

(52) U.S. Cl.
CPC .......... *B23K 20/12* (2013.01); *B23K 20/1295* (2013.01); *B23K 20/227* (2013.01);
(Continued)

(58) Field of Classification Search
None
See application file for complete search history.

(56) References Cited

U.S. PATENT DOCUMENTS 3,777,360 A * 12/1973 Welch .................. B23K 20/129
228/114.5
3,857,163 A * 12/1974 Hirschfield ............ B23K 20/02
228/164

(Continued)

FOREIGN PATENT DOCUMENTS

| CN | 103846545 A | 6/2014 |
|----|-------------|--------|
| DE | 36 26 009 A1 | 2/1987 |

(Continued)

OTHER PUBLICATIONS

Jul. 14, 2015 International Search Report issued in International Patent Application No. PCT/JP2015/061591.

*Primary Examiner* — Devang R Patel
(74) *Attorney, Agent, or Firm* — Oliff PLC

(57) ABSTRACT

The method for producing a metal member includes a step of preparing a first member made of a first metal and having a recessed portion formed therein, and a second member made of a second metal having a smaller deformation resistance than the first metal, and a step of joining the first member and the second member. The step of joining includes a step of increasing temperatures of the first member and the second member by relatively rotating the second member with respect to the first member while pressing the second member against the first member with at least a part of the second member being received in the recessed portion, and a step of stopping the relative rotation of the second member with respect to the first member and cooling the first member and the second member with the members being pressed against each other.

9 Claims, 5 Drawing Sheets

(51) Int. Cl.
   *B23K 20/227* (2006.01)
   *B23K 103/20* (2006.01)
   *B23K 103/22* (2006.01)
(52) U.S. Cl.
   CPC .......... *B23K 20/2275* (2013.01); *B23K 20/24* (2013.01); *B23K 2103/20* (2018.08); *B23K 2103/22* (2018.08)

(56) References Cited

U.S. PATENT DOCUMENTS

| | | | | |
|---|---|---|---|---|
| 5,897,047 | A * | 4/1999 | Takei | B23K 20/12 228/114 |
| 6,638,641 | B2 * | 10/2003 | Delano | B23K 20/129 228/112.1 |
| 2003/0031892 | A1 * | 2/2003 | Fujita | B32B 15/012 428/653 |
| 2003/0066864 | A1 * | 4/2003 | Delano | B23K 20/1295 228/112.1 |
| 2008/0277451 | A1 * | 11/2008 | Slattery | B23K 20/12 228/2.1 |
| 2012/0280485 | A1 * | 11/2012 | Stol | C21D 9/50 285/21.1 |

FOREIGN PATENT DOCUMENTS

| | | |
|---|---|---|
| DE | 10 2006 035 927 A1 | 2/2008 |
| JP | S58-070989 A | 4/1983 |
| JP | H05-293676 A | 11/1993 |
| JP | H10-89241 A | 4/1998 |
| JP | 2000-301364 A | 10/2000 |
| JP | 2000301364 A * | 10/2000 |
| JP | 2000-343246 A | 12/2000 |
| JP | 2003-053556 A | 2/2003 |
| JP | 2012-025179 A | 2/2012 |
| JP | 2014-001448 A | 1/2014 |
| JP | 2014-155991 A | 8/2014 |

* cited by examiner

METHOD FOR PRODUCING METAL MEMBER

TECHNICAL FIELD

The present invention relates to methods for producing metal members, and more specifically, to a method for producing a metal member having a structure in which members made of different metals are joined.

BACKGROUND ART

A metal member having a structure in which members made of different metals are fixed to each other may be adopted as a machine component. For example, as a piston shoe of a hydraulic pump or a hydraulic motor, one having a base section made of steel to which a sliding section made of copper alloy is fixed is known. As a piston shoe of this type, one in which the sliding section is fixed to the base section by caulking may be used.

In order for the sliding section to be fixed to the base section by caulking, the sliding section needs to be machined to a predetermined shape enabling the caulking, before being attached to the base section. This increases the production cost of the sliding component due to the expense required for machining the sliding section. On the other hand, a piston shoe in which the sliding section is fixed to the base section by pressing the sliding section against the base section so that the sliding section is deformed and thus engaged with the base section has been proposed (see, for example, Japanese Patent Application Laid-Open No. H10-89241 (Patent Literature 1)).

CITATION LIST

Patent Literature

Patent Literature 1: Japanese Patent Application Laid-Open No. H10-89241

SUMMARY OF INVENTION

Technical Problem

With the structure of the piston shoe described in Patent Literature 1 above, the sliding section is fixed to the base section only by engagement. If the piston shoe receives an impact, the fixed state of the sliding section to the base section may become unstable.

An object of the present invention is to provide a method for producing a metal member having a structure in which members made of different metals are directly joined firmly to each other.

Solution to Problem

A method for producing a metal member according to the present invention includes the steps of: preparing a first member made of a first metal and having a recessed portion formed therein, and a second member made of a second metal having a smaller deformation resistance than the first metal; and joining the first member and the second member. The step of joining the first member and the second member includes a step of increasing temperatures of the first member and the second member by relatively rotating the second member with respect to the first member while relatively pressing the second member against the first member with at least a part of the second member being received in the recessed portion, and a step of stopping the relative rotation of the second member with respect to the first member and cooling the first member and the second member with the members being pressed against each other.

In the metal member producing method of the present invention, the first member and the second member are heated as the second member is relatively rotated while being pressed against the first member with at least a part of the second member being received in the recessed portion of the first member. At this time, the second member is smaller in deformation resistance than the first member, so the second member is deformed. Such deformation of the second member is limited by the wall surface defining the recessed portion of the first member. This prevents the heat generated by the friction between the first member and the second member from being released from within the recessed portion. The first and second members thus heated are cooled while being maintained in the state of contacting each other, whereby the first member and the second member are joined directly.

As such, according to the metal member producing method of the present invention, it is possible to produce the metal member having a structure in which members made of different metals are directly joined firmly to each other.

In the metal member producing method described above, the first member may include a recessed portion bottom surface defining the recessed portion, and a recessed portion side surface defining the recessed portion and extending in a direction intersecting the recessed portion bottom surface. In the step of increasing the temperatures of the first member and the second member, the second member may be relatively rotated while being relatively pressed against the recessed portion bottom surface of the first member. This makes it readily possible to carry out the metal member producing method described above.

In the metal member producing method described above, in the step of increasing the temperatures of the first member and the second member, the second member may be deformed to contact the recessed portion side surface. With the recessed portion side surface limiting the deformation of the second member, it is readily possible to carry out the metal member producing method described above.

The metal member producing method described above may further include the step of, in a state where the first member and the second member are joined, machining the first member to remove the recessed portion side surface. With this configuration, it is possible to obtain the metal member which is formed as the first member is joined at its recessed portion bottom surface to the second member.

In the metal member producing method described above, in the step of increasing the temperatures of the first member and the second member, the second member may be rotated while the first member is fixed. This makes it readily possible to carry out the metal member producing method described above.

The metal member producing method described above may further include the step of, in a state where the first member and the second member are joined, removing a flash formed due to deformation of the second member in the step of increasing the temperatures of the first member and the second member. With this configuration, it is possible to obtain the metal member having removed therefrom the flash formed while joining the first member and the second member.

In the metal member producing method described above, in the step of increasing the temperatures of the first member and the second member, the second metal in a temperature increased state may have a deformation resistance smaller by 10% or more as compared to a deformation resistance of the first metal in a temperature increased state. This facilitates joining of the first member with the second member.

Effects of the Invention

As is clear from the above description, according to the metal member producing method of the present invention, it is possible to produce the metal member having a structure in which members made of different metals are directly joined firmly to each other.

DESCRIPTION OF EMBODIMENT

Figure 1:
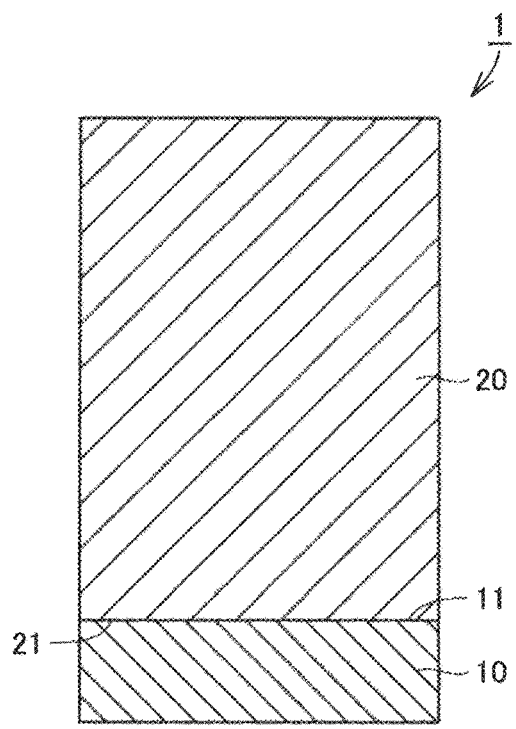
FIG. 1 is a schematic cross-sectional view showing the structure of a metal member.

An embodiment of the present invention will now be described. In the following drawings, the same or corresponding parts are denoted by the same reference numerals, and the description thereof will not be repeated.

FIG. 1 is a schematic cross-sectional view showing the structure of a metal member (machine component) that can be produced by the method for producing a metal member according to the present embodiment. Referring to FIG. 1, the metal member 1 has a structure in which a first member 10 made of a first metal and a second member 20 made of a second metal are joined together.

The first member 10 has a cylindrical (disk) shape. One end face 11 of the first member 10 serves as a joint surface with the second member 20. The second member 20 has a cylindrical shape. One end face 21 of the second member 20 serves as a joint surface with the first member 10. The second metal constituting the second member 20 has a deformation resistance smaller than that of the first metal constituting the first member 10. This metal member 1 can be produced by the method for producing a metal member in the present embodiment as follows.

Figure 2:
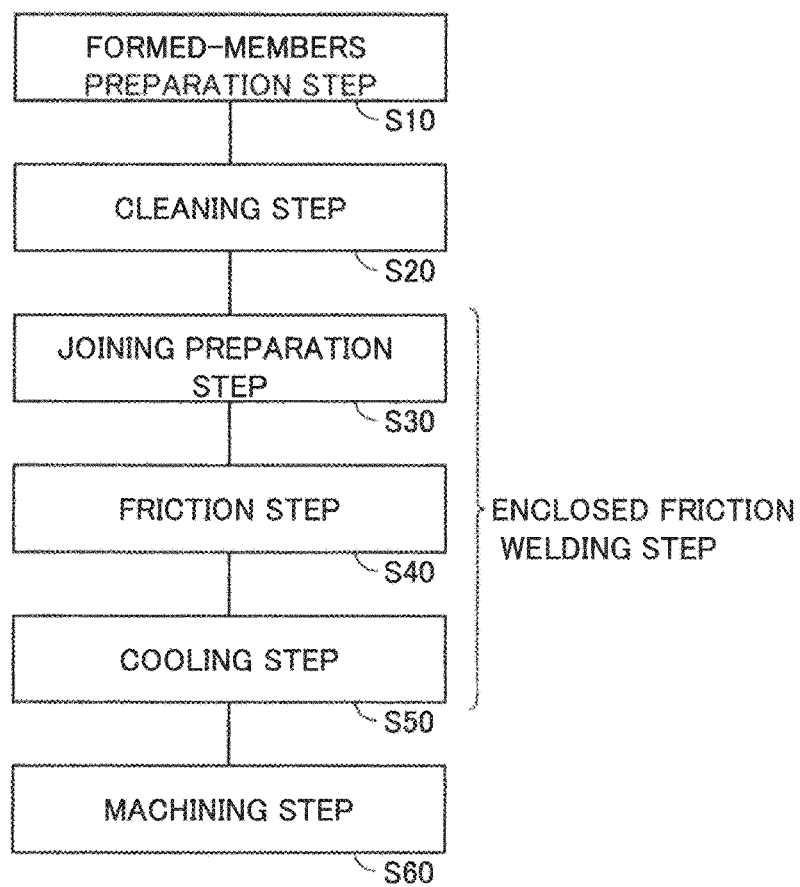
FIG. 2 is a flowchart schematically illustrating a method for producing a metal member.
Figure 3:
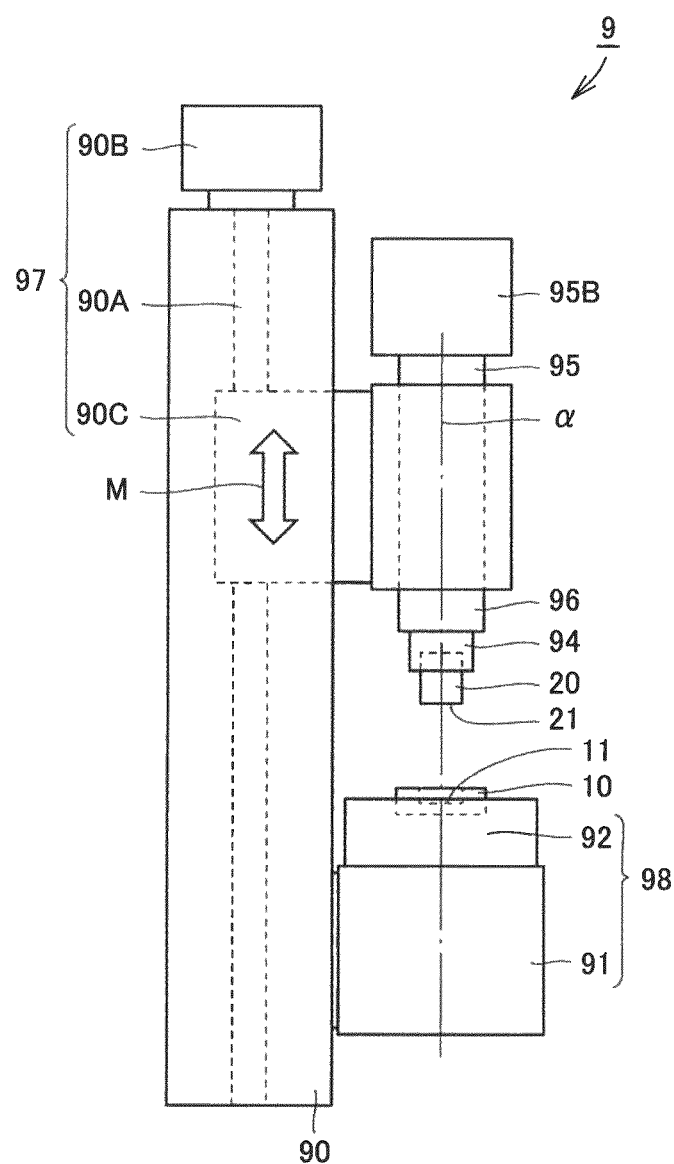
FIG. 3 is a schematic diagram showing the structure of a device for producing a metal member.
Figure 4:
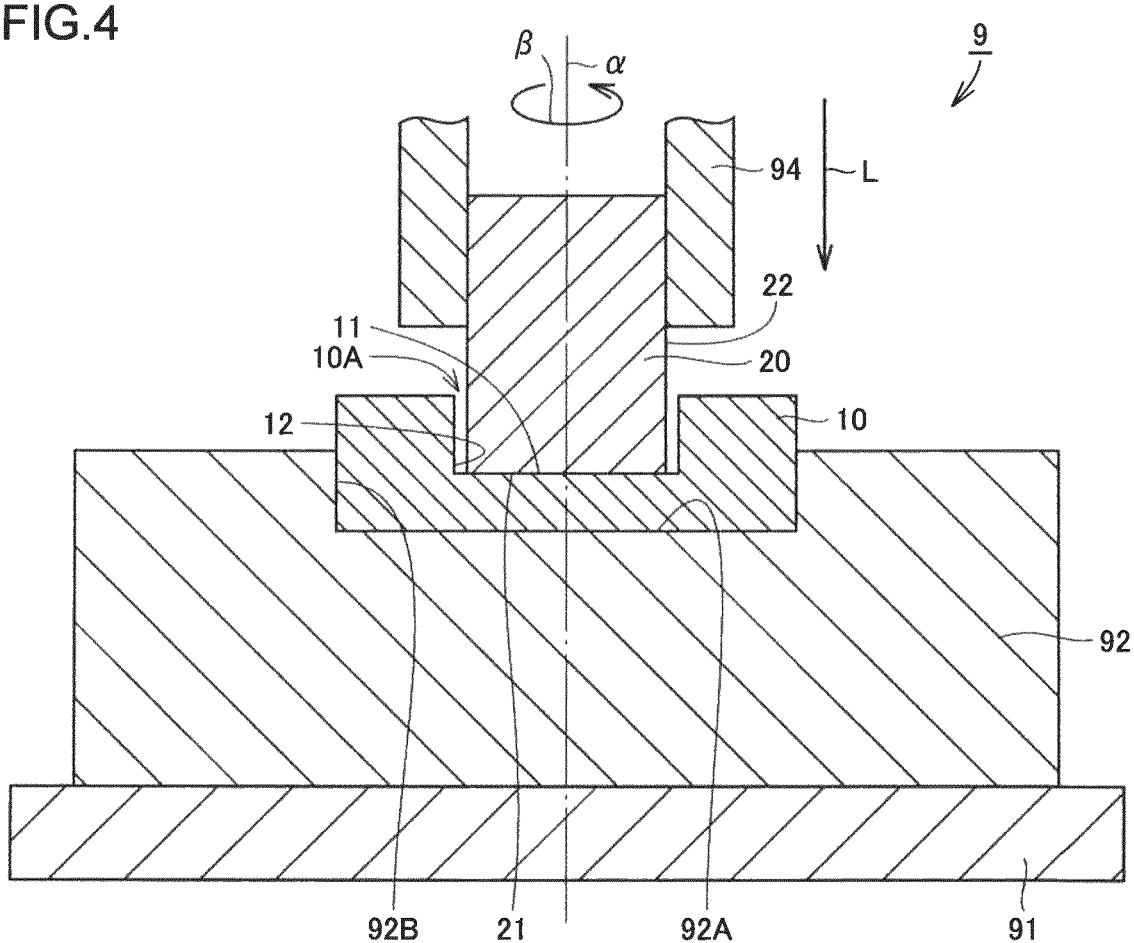
FIG. 4 is a schematic cross-sectional view showing the operation of the metal member producing device.
Figure 5:
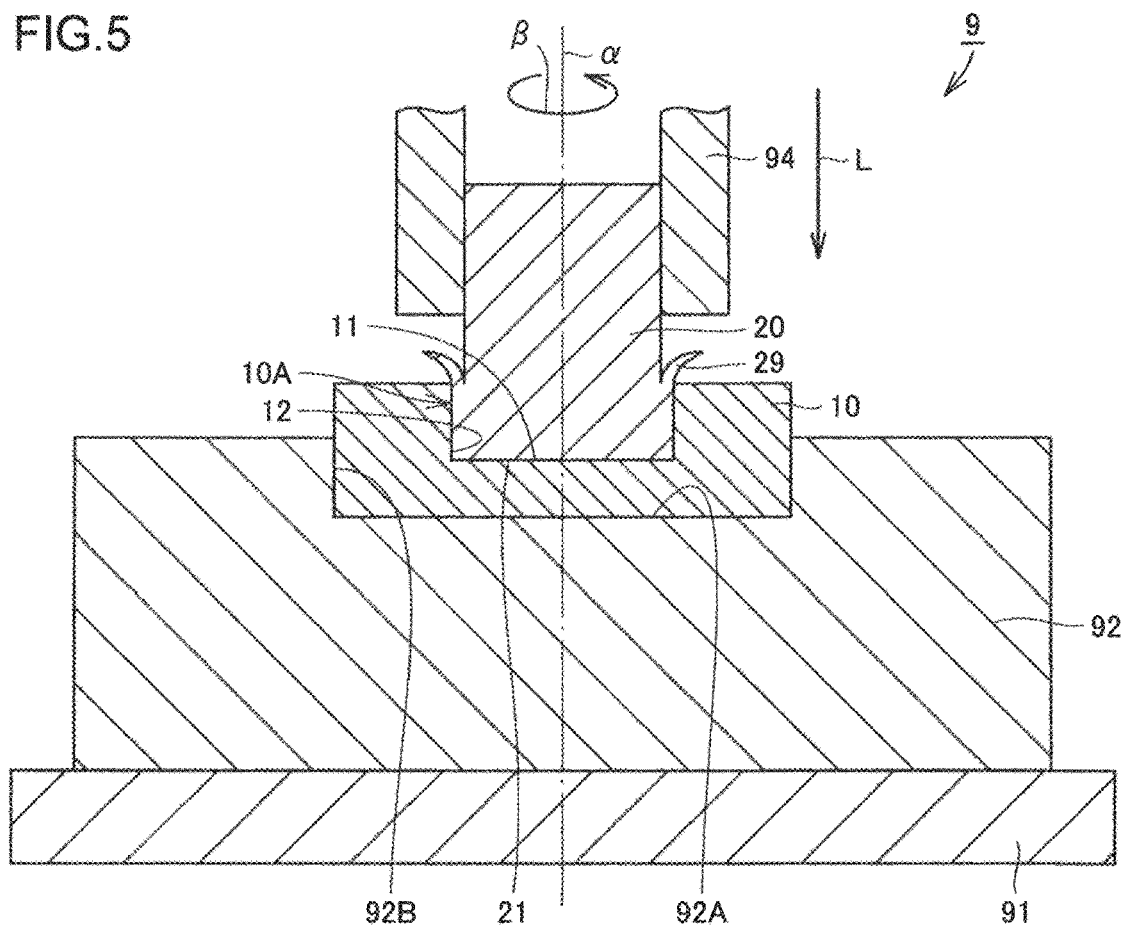
FIG. 5 is a schematic cross-sectional view illustrating the metal member producing method.
Figure 6:
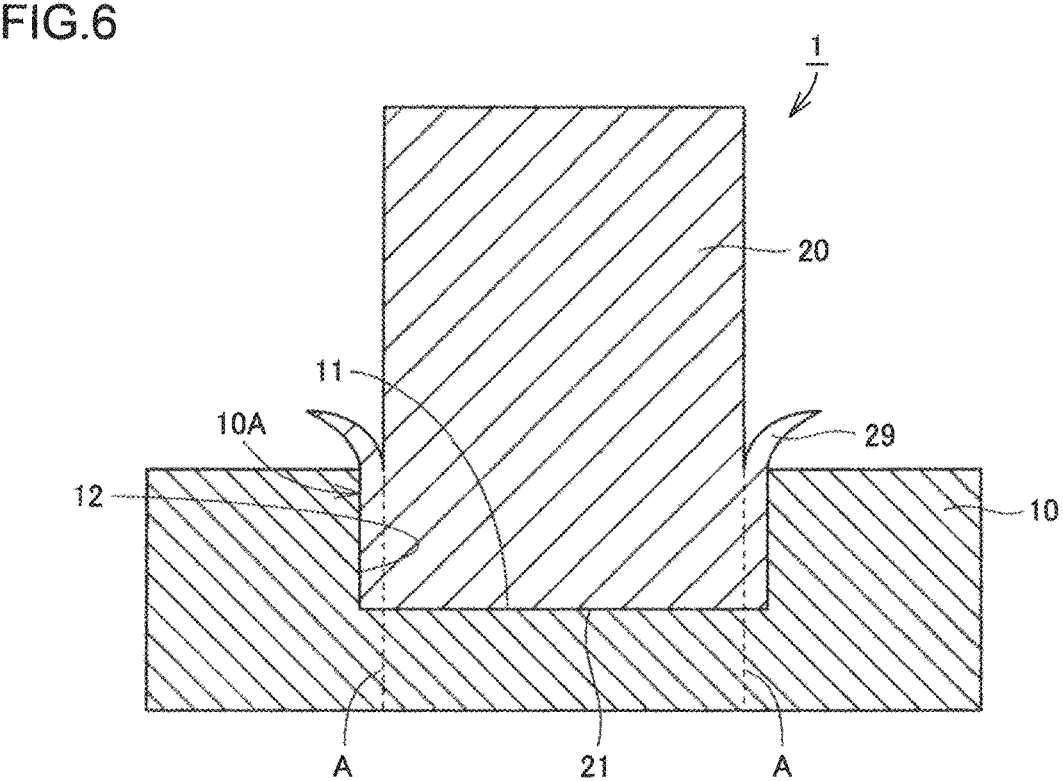
FIG. 6 is another schematic cross-sectional view illustrating the metal member producing method.

FIG. 2 is a flowchart schematically illustrating the method for producing a metal member. FIG. 3 is a schematic diagram showing the structure of a device for producing a metal member. FIG. 4 is a schematic cross-sectional view showing the operation of the metal member producing device. FIGS. 5 and 6 are schematic cross-sectional views illustrating the metal member producing method.

Referring to FIG. 2, in the method for producing the metal member 1 in the present embodiment, first, a formed-members preparation step is carried out as a step S10. In this step S10, referring to FIG. 4, a first member 10, made of thermally refined alloy steel for machine structural use, and a second member 20, made of high-strength brass, for example, are prepared. The second member 20 has a cylindrical shape.

The first member 10 has a cylindrical shape (disk shape). The first member 10 has a recessed portion 10A. The recessed portion 10A is formed to include a central axis of the first member 10. The recessed portion 10A has a cylindrical shape. The central axis of the first member 10 and the central axis of the recessed portion 10A are aligned with each other. The first member 10 includes a recessed portion bottom surface 11 defining the recessed portion 10A, and a recessed portion side surface 12 defining the recessed portion 10A and extending in a direction intersecting the recessed portion bottom surface 11.

The recessed portion bottom surface 11 of the first member 10 serves as a first member contact surface, which is a flat surface to be joined to the second member 20. The one end face 21 of the second member 20 serves as a second member contact surface, which is a flat surface to be joined to the first member 10.

Next, a cleaning step is carried out as a step S20. In this step S20, the first member 10 and the second member 20 prepared in the step S10 are cleaned. The first member 10 and the second member 20 are cleaned using, for example, methanol, ethanol, acetone, or other liquid. This removes any foreign matters attached to the first member 10 or the second member 20 during the cutting, machining, or other processes for preparing the first member 10 and the second member 20. In the method for producing the metal member 1 in the present embodiment, precision finish work on the one end face 21 of the second member 20 may be omitted. The one end face 21 of the second member 20 may be left as cut.

Next, referring to FIG. 2, an enclosed friction welding step is carried out. This enclosed friction welding step includes a joining preparation step, a friction step, and a cooling step.

Here, a device for producing a metal member which produces the metal member 1 by conducting enclosed friction welding will be described. Referring to FIG. 3, an enclosed friction welding device 9 which is the device for producing a metal member includes: a spindle 95 which is rotatable about an axis α, a base portion 98 disposed spaced apart from the spindle 95 in the axis α direction, a driving portion 97 which adjusts the spacing between the spindle 95 and the base portion 98 by driving the spindle 95 in the axis α directions, and a frame 90 which supports the spindle 95 and the base portion 98.

Referring to FIG. 3, inside the frame 90, a shaft 90A is disposed to extend in parallel with the axis α. This shaft 90A supports a spindle support portion 90C which supports the spindle 95, so as to allow the spindle support portion 90C to move in the directions in which the shaft 90A extends. A spindle moving motor 90B for driving the shaft 90A is connected to the shaft 90A. As the shaft 90A is driven by the spindle moving motor 90B, the spindle 95 supported by the spindle support portion 90C moves in the axis α directions. This enables adjustment of the spacing between the spindle 95 and the base portion 98. The shaft 90A, the spindle support portion 90C, and the spindle moving motor 90B constitute the driving portion 97.

The spindle 95 includes a rotation-side chuck 94, which holds the second member 20 to oppose the base portion 98. The spindle 95 has connected thereto a spindle motor 95B which rotatively drives the spindle 95 about the axis α. The spindle 95 further has mounted thereon a load sensor 96 which detects a contact load between the first member 10 and the second member 20. The load sensor 96 detects the contact load between the first member 10 and the second member 20 from the magnitude of the contact reaction force between the first member 10 and the second member 20 that is applied to the rotation-side chuck 94. Although the load sensor 96 is not an indispensable component for the enclosed friction welding device 9, the sensor, when provided, facilitates adjusting the contact load between the first member 10 and the second member 20 to an appropriate range.

The base portion 98 includes a fixed-side chuck 92, which holds the first member 10 to oppose the rotation-side chuck 94. Referring to FIGS. 3 and 4, the base portion 98 includes a base body 91 and the fixed-side chuck 92. The base body 91 is disposed on the frame 90. The fixed-side chuck 92 is fixed on the base body 91. The fixed-side chuck 92 includes a bottom surface 92A, which holds the first member 10 in the axial direction, and a radial chuck surface 92B, which holds the first member 10 in the radial direction.

A specific procedure of the enclosed friction welding step will now be described. Referring to FIG. 3, in the joining preparation step carried out as a step S30, the first member 10 is held at the outer peripheral surface by the rotation-side chuck 94. The second member 20 is held at the outer peripheral surface by the fixed-side chuck 92. At this time, the first member 10 and the second member 20 are arranged so that the recessed portion bottom surface 11 of the first member 10 and the one end face 21 of the second member 20 oppose each other, and that the central axes of the first member 10 and the second member 20 agree with the rotational axis α of the rotation-side chuck 94.

Next, the friction step is carried out as a step S40. In this step S40, the spindle 95 is driven by the spindle motor 95B to rotate about the axis α, and it is also driven by the spindle moving motor 90B to approach the base portion 98. Consequently, the rotation-side chuck 94 approaches the fixed-side chuck 92 while rotating about the axis α.

Then, as shown in FIG. 4, in a state where at least a part (a region including the one end face 21) of the second member 20 is received in the recessed portion 10A, the second member 20 relatively rotates, while being pressed against the first member 10 with a prescribed load, without changing its position relative to the first member 10. The second member 20 rotates while being relatively pressed against the recessed portion bottom surface 11 of the first member 10. This increases the temperatures of the contact portions (joint portions) of the first member 10 and the second member 20 because of the frictional heat. The temperature of the second member 20 increases, for example, to a temperature that is not lower than the softening point and lower than the melting point of the second metal constituting the second member 20.

At the beginning of rotation, there is a gap between an outer peripheral surface 22 of the second member 20 and the recessed portion side surface 12 of the first member 10. At the start of rotation, the outer peripheral surface 22 of the second member 20 is not in contact with the recessed portion side surface 12 of the first member 10.

The second member 20 has a deformation resistance smaller than that of the first member 10, as explained above. Referring to FIG. 5, the heated second member 20 softens and deforms, thereby contacting the recessed portion side surface 12. The deformation of the second member 20 is limited by the wall surfaces (recessed portion bottom surface 11 and recessed portion side surface 12) defining the recessed portion 10A of the first member 10. This prevents the heat generated by the friction between the first member 10 and the second member 20 from being released from within the recessed portion 10A. The recessed portion 10A is filled with the softened second member 20. A flash 29 is formed due to deformation of the second member 20.

Next, the cooling step is carried out as a step S50. In this step S50, first, the rotational speed of the spindle 95 is lowered, and the rotation is stopped. Thereafter, the pressing load detected by the load sensor 96 is decreased. During this time, the contact portions of the first member 10 and the second member 20 are cooled, with the first member 10 and the second member 20 maintaining the state of being pressed against each other. Accordingly, the first member 10 and the second member 20 are joined. Then, the pressing load is set to zero, and the metal member 1, which is the structural body formed with the first member 10 and the second member 20 joined together, is taken out from the enclosed friction welding device 9 (see FIG. 6). Through the above procedure, the enclosed friction welding step is completed.

Next, a machining step is carried out as a step S60. In this step S60, the metal member 1 obtained in the step S50 is subjected to cutting and other machining. Referring to FIG. 6, in the step S60, in the state where the first member 10 and the second member 20 are joined, the flash 29 formed due to deformation of the second member 20 in the step S40 is removed.

Referring to FIG. 6, in the step S60, further in the state where the first member 10 and the second member 20 are joined, the first member 10 is machined so that the recessed portion side surface 12 is removed. The first member 10 is cut along the broken line A, so that the outer peripheral region including the recessed portion side surface 12 as well as the flash 29 is removed. Through the above procedure, the metal member 1, which is the joint body of the first member 10 and the second member 20 shown in FIG. 1, is obtained. The removal of the outer peripheral region including the recessed portion side surface 12 and the removal of the flash 29 may be performed continuously as a single step, or may be performed as separate steps at different times. Thereafter, heat treatment, finishing work, and so on are performed as appropriate, whereby the metal member 1 is completed.

As described above, according to the method for producing the metal member 1 using the enclosed friction welding device 9 in the present embodiment, it is possible to produce the metal member 1 having a structure in which the first member 10 made of the first metal and the second member 20 made of the second metal having a smaller deformation resistance than the first metal are directly joined firmly to each other. The metal member 1 having the structure in which members made of different metals are directly joined firmly to each other is produced.

In the step S40, the deformation resistance of the second member 20 (second metal) in the temperature increased state is preferably smaller by 10% or more, more preferably smaller by 50% or more, and further preferably smaller by 80% or more, as compared to the deformation resistance of the first member 10 (first metal) in the temperature increased state. As explained above, the first member 10 and the second member 20 can be joined as in the present embodiment in the case where the second member 20 (second metal) is smaller in deformation resistance than the first member 10 (first metal). If the difference in deformation resistance between the first member 10 and the second member 20 is small, however, not only the second member 20, but also the first member 10 may be deformed in the step S40.

In such a case, it would be difficult to join the first member 10 and the second member 20 satisfactorily, thereby creating a need to strictly manage the temperatures of the first member 10 and the second member 20 in the step S40. Setting the deformation resistance of the second metal in the temperature increased state smaller than that of the first metal by 10% or more in the step S40 facilitates achievement of good joining. Setting the deformation resistance of the second metal in the temperature increased state smaller than that of the first metal by 50% or more, or even 80% or more, can further facilitate the achievement of good joining.

EXAMPLE

Figure 7:
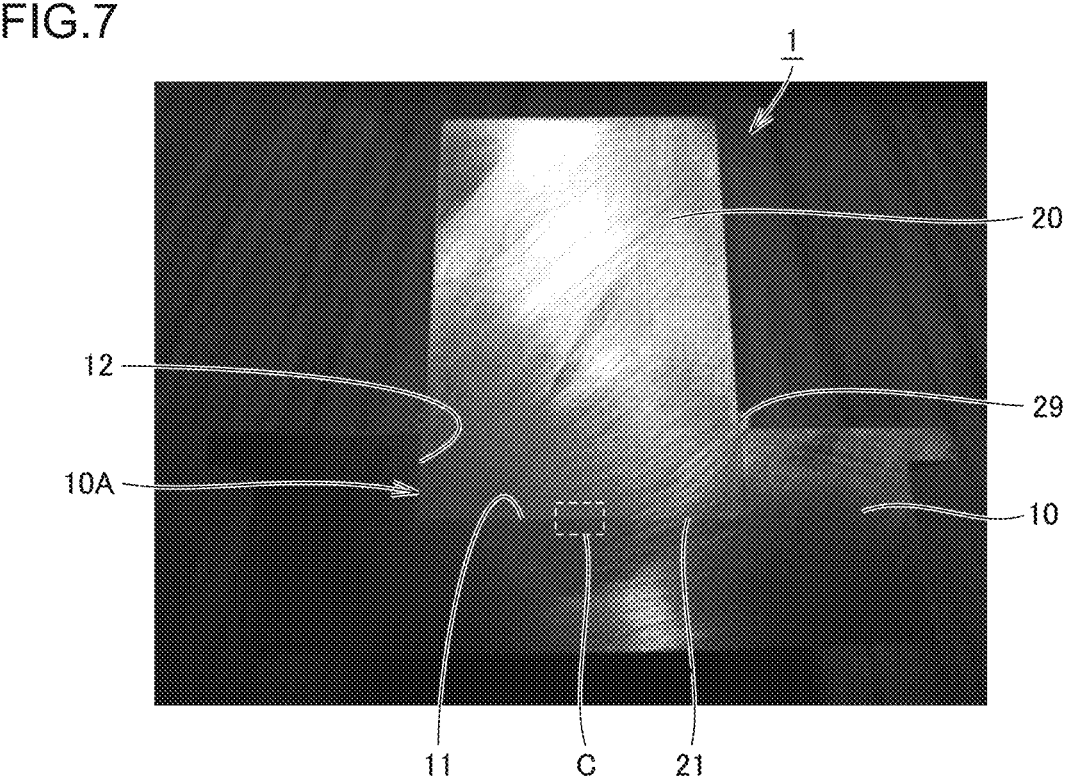
FIG. 7 is a photograph showing an example of a metal member having a first member made of steel and a second member made of brass joined together.
Figure 8:
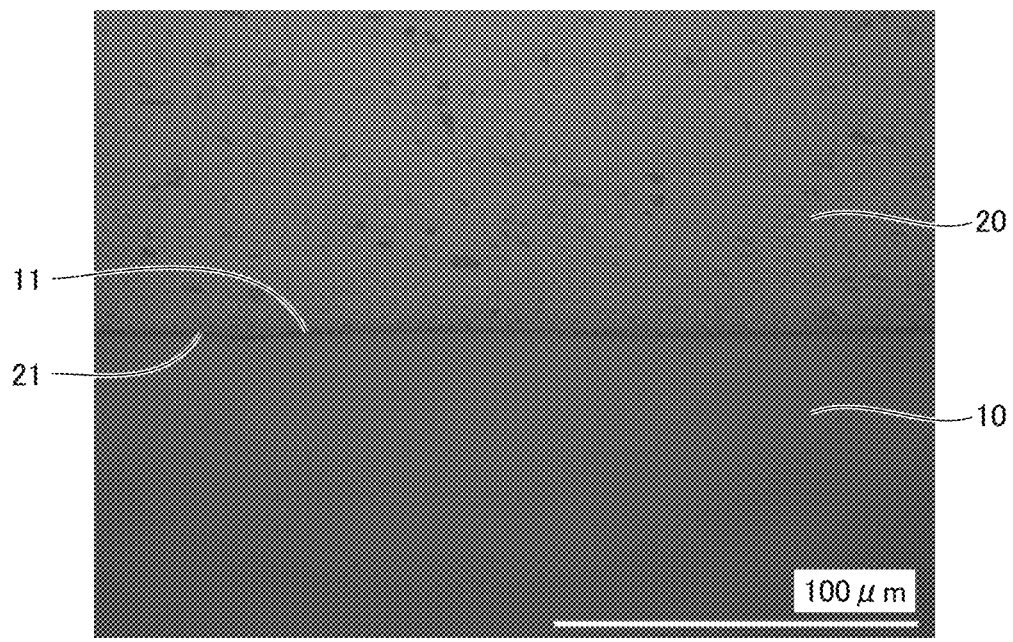
FIG. 8 is a photograph showing the state at and around the interface between the first member and the second member.

An experiment was conducted in which a first member 10 and a second member 20 were joined through a similar procedure as in the above embodiment to produce a sample of the metal member 1. For the metal (first metal) constituting the first member 10, JIS SCM440 (quenched and tempered), which is steel (alloy steel for machine structural use) was adopted. For the metal (second metal) constituting the second member 20, high-strength brass was adopted. The obtained sample was cut in a plane including the central axis. FIG. 7 is a photograph showing the cross section. FIG. 8 is a photograph showing the state at and around the interface between the first member 10 and the second member 20.

Referring to FIG. 7, a metal member 1 having a structure in which the first member 10 and the second member 20 are joined was obtained through the procedure similar to that in the above embodiment. Referring to FIG. 8, it is recognized that the first member 10 and the second member 20 are joined favorably at the joint surfaces, or, the recessed portion bottom surface 11 and the one end face 21. The above experimental results show that the metal member producing method according to the present invention is able to produce the metal member having a structure in which members made of different metals are directly joined firmly to each other.

While the case of adopting steel as the metal (first metal) constituting the first member and brass as the metal (second metal) constituting the second member has been given by way of example in the embodiment and example described above, the metals adoptable in the present invention are not limited thereto. Examples of combination of adoptable metals are shown in Table 1 below.

TABLE 1

| First Member | Second Member |
|---|---|
| steel | brass |
| steel | aluminum alloy |
| steel | nickel-based alloy |
| cemented carbide | steel |

As shown in Table 1, in the metal member producing method of the present invention, various combinations of the first member made of a first metal and the second member made of a second metal having a smaller deformation resistance than the first metal can be adopted.

It should be understood that the embodiment and example disclosed herein are illustrative and non-restrictive in every respect. The scope of the present invention is defined by the terms of the claims, rather than the description above, and is intended to include any modifications and improvements within the scope and meaning equivalent to the terms of the claims.

INDUSTRIAL APPLICABILITY

The metal member producing method according to the present invention may be applicable particularly advantageously to the production of a metal member having a structure in which members made of different metals are directly joined to each other.

DESCRIPTION OF REFERENCE NUMERALS

1: metal member; 9: enclosed friction welding device; 10: first member; 10A: recessed portion; 11: recessed portion bottom surface (end face); 12: recessed portion side surface; 20: second member; 21: end face; 22: outer peripheral surface; 29: flash; 90: frame; 90A: shaft; 90B: spindle moving motor; 90C: spindle support portion; 91: base body; 92: fixed-side chuck; 92A: bottom surface; 92B: radial chuck surface; 94: rotation-side chuck; 95: spindle; 95B: spindle motor; 96: load sensor; 97: driving portion; and 98: base portion.

The invention claimed is:
1. A method for producing a metal member, comprising the steps of:
preparing a first member made of a first metal and having a recessed portion formed therein, and a second member made of a second metal having a smaller deformation resistance than the first metal;
joining the first member and the second member;
the step of joining the first member and the second member including steps of
increasing temperatures of the first member and the second member by relatively rotating the second member with respect to the first member while relatively pressing the second member against the first member with at least a part of the second member being received in the recessed portion, and
stopping the relative rotation of the second member with respect to the first member and cooling the first member and the second member with the members being pressed against each other,
wherein the first member includes a recessed portion bottom surface defining the recessed portion, and a recessed portion side surface defining the recessed portion and extending in a direction perpendicular from the recessed portion bottom surface, and
wherein, before beginning rotation, the second member is pressed against the recessed portion bottom surface and an outer peripheral surface of the second member is spaced from the recessed portion side surface; and
machining the first member and the second member after the step of joining the first member and the second member such that the recessed portion side surface is removed, wherein the first member and the second member are machined so that outer peripheral surfaces of the first member and the second member are smooth and continuous.
2. The method for producing a metal member according to claim 1, wherein
in the step of increasing the temperatures of the first member and the second member, the second member is relatively rotated while being relatively pressed against the recessed portion bottom surface of the first member.
3. The method for producing a metal member according to claim 2, wherein in the step of increasing the temperatures of the first member and the second member, the second member is deformed to contact the recessed portion side surface.

4. The method for producing a metal member according to claim 2, further comprising the step of, in a state where the first member and the second member are joined, machining the first member to remove the recessed portion side surface.

5. The method for producing a metal member according to claim 1, wherein in the step of increasing the temperatures of the first member and the second member, the second member is rotated while the first member is fixed.

6. The method for producing a metal member according to claim 1, further comprising the step of, in a state where the first member and the second member are joined, removing a flash formed due to deformation of the second member in the step of increasing the temperatures of the first member and the second member.

7. The method for producing a metal member according to claim 1, wherein in the step of increasing the temperatures of the first member and the second member, the second metal in a temperature increased state has a deformation resistance smaller by 10% or more as compared to a deformation resistance of the first metal in a temperature increased state.

8. The method for producing a metal member according to claim 1, wherein, before beginning rotation, the second member is pressed against the recessed portion bottom surface and the outer peripheral surface of the second member in an axial direction is spaced from the recessed portion side surface such that the recessed portion side surface does not restrict movement of the second member in a radial direction.

9. The method for producing a metal member according to claim 1, wherein the second member has a cylindrical shape.

* * * * *